United States Patent Office 2,902,409
Patented Sept. 1, 1959

2,902,409

PRODUCTION OF LYSINE, ARGININE, AND GLUTAMIC ACIDS

Reginald H. Haskins, Saskatoon, Saskatchewan, and John F. T. Spencer, Sutherland, Saskatoon, Saskatchewan, Canada, assignors to National Research Council, Ottawa, Ontario, Canada, a body corporate of Canada No Drawing. Application April 24, 1958
Serial No. 730,529

7 Claims. (Cl. 195—36)

This invention relates to an improved process for the production, by fermentation, of lysine and other amino acids.

Lysine is an amino acid of commercial importance. It and its associated amino acids are growth stimulating and useful individually and collectively as feed supplements.

The object of the invention is to provide a fermentation process, which may be continuously operated, for the production in commercial yields of lysine with other amino acids such as arginine, glutamic, leucine, proline, tryptophane, phenylalanine and the like.

The fermentation microorganism is *Ustilago maydis*.

Vegetative cells of the fungus *Ustilago maydis* were grown for 48 hours on a rotary shaker at 28° C. in a sterilized nutritive aqueous solution containing d(+) dextrose (5%), diammonium phosphate (0.5%), dipotassium phosphate (0.1%), magnesium sulfate (0.01%), potassium chloride (0.05%), ferrous sulfate (0.002%) and zinc sulfate (0.001%).

It has been found that good yields of the amino acids are obtained when a nutrient medium, inoculated with the microorganism, is fermented under submerged aerobic condition, at a temperature of 30 to 38° C., substantially 30° for the first period and substantially 38° C. for the remaining period of growth. Under these temperature conditions the yield is substantially higher than when lower temperatures of fermentation are used. The mixture is then preferably allowed to stand in unagitated, unaerated condition for two to four days before removal of the culture solids by centrifugation or other known procedure.

The following examples are illustrative of the operation of the process of the invention.

The nutrient medium contains essentially a source of carbohydrate, a source of nitrogen and salts normally found in such mediums.

Example 1

Five-liter fermentation tanks were prepared each containing 3 liters of a sterilized aqueous glucose (10%) solution containing diammonium phosphate (0.7%), calcium carbonate (0.17%), dipotassium phosphate (0.03%), monopotassium phosphate (0.02%), magnesium sulfate (0.02%), sodium chloride (0.01%), calcium chloride (0.01%), ferrous sulfate (0.002%) and zinc sulfate (.003%). The fermentation medium was inoculated with a 5% (by volume) inoculum of *Ustilago maydis* (PRL 1092 strain A.T.C.C. 13172). The stirring speed was 400 r.p.m., the air flow rate was 0.33 l./l./min. and the initial temperature was 30° C., and after about 60 hours it was raised to 38° C.

After 7 days the supernatant liquid was assayed microbiologically and found to contain 1200 mgm. per liter lysine.

Example 2

As for Example 1 but with the fermentation medium altered so that the ferrous sulfate content was increased from 0.002% to 0.005%–0.010%. The supernatant liquid assayed as having a substantially increased content of glutamic acid.

Example 3

Five-liter fermentation tanks were prepared, each containing 3 liters of a sterilized aqueous medium containing d(+) dextrose (15%), diammonium phosphate (0.84%), calcium carbonate (0.17%), dipotassium phosphate (0.1%), magnesium sulfate (0.1%), potassium chloride (0.05%), ferrous sulfate (0.002%) and zinc sulfate (0.001%). The fermentation medium was inoculated with a 5% (by volume) inoculum of *Ustilago maydis* (PRL 1704 strain, A.T.C.C. 13131). The fermentation tanks were aerated with sterile air at the rate of 0.3 liters air per liter culture medium per minute. The initial temperature of 30° C. was raised to 38° C. after the first 48 hours, which temperature was maintained for 48 hours of further growth. The culture medium was then allowed to stand unagitated and not aerated for 2 to 4 days. The supernatant liquid was assayed as having a lysine content of 1950 mgm. per liter, arginine about 3000 mgm. per liter, and glutamic acid about 1900 mgm. per liter.

Example 4

As for Example 3, except dextrose 12.5%. The yield of lysine was 1820 mgm. per liter.

Example 5

As for Example 3, except dextrose 10% and diammonium phosphate 0.7%. The temperature of incubation for the third and fourth days was 36° C. The yield of lysine was 1930 mgm. per liter.

The strains PRL 1092, A.T.C.C. 13172, and PRL 1704, A.T.C.C. 13131 were subjected to ultraviolet radiation prior to use in the process.

It will be apparent from the results shown in these examples that the defined temperature conditions under which the fermentation is carried out substantially increases the yield of lysine and related amino acids.

What is claimed is:

1. An improved process for the production of lysine, arginine and glutamic acids which comprises fermenting under submerged aerobic conditions on a nutrient medium, having as essential constituents glucose and a source of nitrogen, with a strain of *Ustilago maydis* at a temperature of not less than 30° C.

2. The process definied in claim 1 wherein the temperature is maintained at substantially 30° C. for the initial period of fermentation and at substantially 37–38° C. for the remaining period.

3. The process defined in claim 1 wherein the strain is A.T.C.C. 13172.

4. The process defined in claim 1 wherein the strain is A.T.C.C. 13131.

5. The process defined in claim 1 wherein the nutrient medium contains 0.005 to 0.01% of ferrous sulphate.

6. The process for the production of lysine, arginine and glutamic acids which comprises fermenting with *Ustilago maydis*, A.T.C.C. 13131 strain on a nutrient medium containing essentially dextrose, and diammonium phosphate, maintaining the temperature at not less than 30° C. for the initial period of fermentation and at substanially 37–38° C. for the remaining period.

7. The process defined in claim 6 wherein the nutrient medium comprises a sterilized 15% solution of dextrose containing substantially 0.84% diammonium phosphate, 0.17% calcium carbonate, 0.1% dipotassium phosphate, 0.1% magnesium sulphate, 0.05% potassium chloride, 0.002% ferrous sulphate and 0.001% zinc sulphate.

References Cited in the file of this patent

UNITED STATES PATENTS

| | | |
|---|---|---|
| 2,701,794 | Lemieux | Feb. 8, 1955 |
| 2,773,001 | Smythe et al. | Dec. 4, 1956 |
| 2,789,939 | Kita | Apr. 23, 1957 |